Feb. 8, 1966 A. SHAINES ET AL 3,233,742
APPARATUS FOR SEPARATING SLOWLY SETTLING SOLIDS FROM LIQUIDS
Filed July 19, 1963 5 Sheets-Sheet 1

INVENTORS
Alfred Shaines
I-Kuen Yen
BY
*Frank J. Jordan*
ATTORNEY

INVENTORS
Alfred Shaines
I-Kuen Yen
BY
*Frank J. Jordan*
ATTORNEY

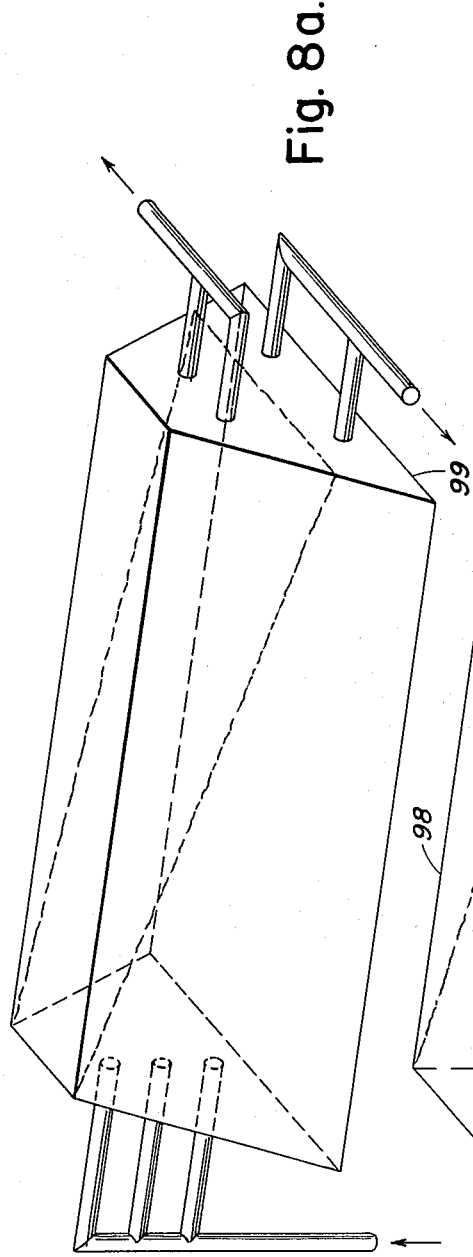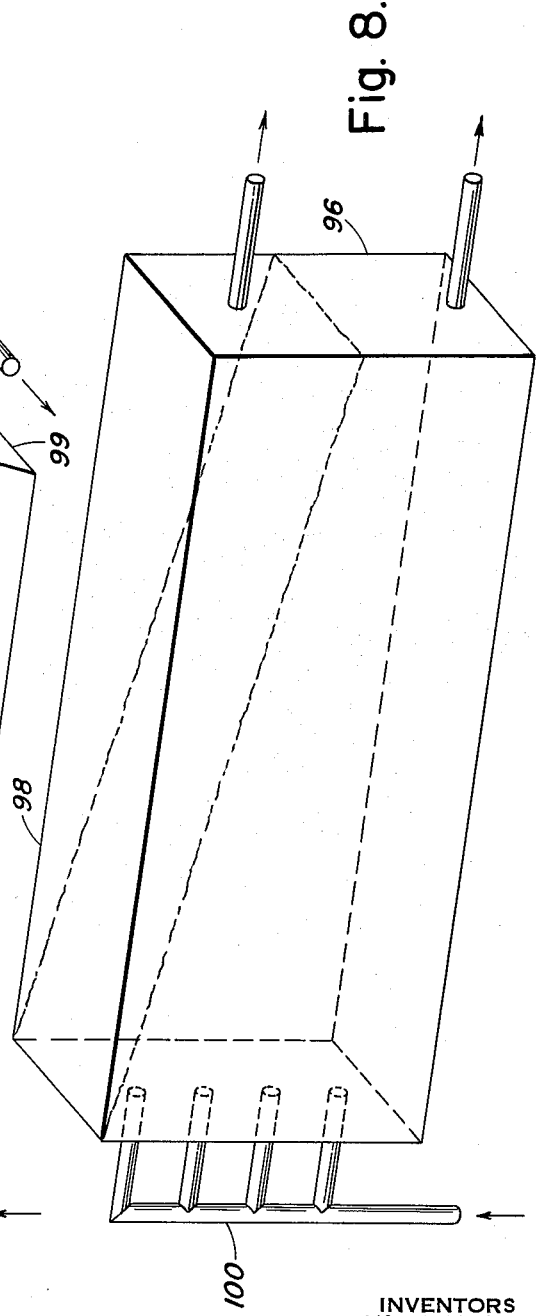
INVENTORS
Alfred Shaines
I-Kuen Yen
ATTORNEY

UnitedStates Patent Office 3,233,742
Patented Feb. 8, 1966

3,233,742
APPARATUS FOR SEPARATING SLOWLY
SETTLING SOLIDS FROM LIQUIDS
Alfred Shaines, Fanwood, and I-Kuen Yen, Newark, N.J., assignors to American Radiator & Standard Sanitary Corporation, New York, N.Y., a corporation of Delaware
Filed July 19, 1963, Ser. No. 296,354
5 Claims. (Cl. 210—526)

This invention relates generally to novel methods and apparatus for concentrating sewage and other difficult-to-concentrate slurries containing organic materials, inorganic materials or a mixture of these.

Present day sewage treatment processes usually consist of a primary treatment, a secondary treatment, and sludge disposal. The primary treatment results in the separation of raw settleable solids from water by sedimentation. The effluent liquor from this treatment is not clear and usually must be treated further by a secondary process in which chemicals or biological organisms are used to coagulate the suspended and soluble solids and settle them from the water. The relatively concentrated water suspensions of solids collected from the primary and secondary treatments are known as sludge. In appearance, sludge is a brown to black slurry containing up to about 5% of solids. Sludge is difficult and expensive to concentrate beyond this point, is odoriferous, unsightly and highly pollutant.

A major problem in the disposal of sludge is the concentration of the sludge so that it can be disposed of as inexpensively as possible by lagooning, incineration, wet combustion or by being barged out to sea.

Many techniques have been suggested and tried to find a method to economically concentrate sewage sludge. These have included vacuum filtration, pressure filtration, centrifugation, compression, flotation, and the use of vibrating screens. To facilitate this concentration, different methods of pretreatment have also been tried, including the addition of inorganic and organic chemicals, heating, freezing and subjecting the sludge to ultrasonic vibrations. Most of these prior art attempts have had only limited success and all suffer from one or more serious technical or economic disadvantages.

In the course of a systematic study of the properties of sludge, it was found that if controlled velocity gradients were induced in the sludge, the solids therein agglomerate and settle at a higher rate and to a greater extent than they do in the absence of these gradients.

One of the principal objects of this invention is therefore to provide novel means, methods and processes for the concentration of sewage sludge and other slowly settling suspensions.

Another object of this invention is to provide novel means and methods of imposing a shear stress on sewage sludge and other slowly settling suspenion in such a controlled manner so as to effect the rapid settling of the solids contained therein.

It is another object of this invention to provide novel means and methods of inducing velocity gradients in sewage sludge and other slowly settling suspensions in a prescribed manner so as to effect the rapid settling of the solids contained therein.

It is yet another object of this invention to provide a method for accelerating the settling of slowly settling solids by slowly moving the carrier liquid past stationary surfaces in contact with the liquid and at the same time provide mechanical or other means for moving the settled solids.

Other objects and features of the invention will appear as the description of the particular embodiment selected to illustrate the invention progresses. In the accompanying drawings, which form a part of this specification, like characters of reference have been applied to corresponding parts through the several views which make up the drawings.

FIGURE 5 is a cross-sectional view of another version of the invention using a porous rotating cylinder.

FIGURE 8 is a perspective view of another embodiment of the invention in which the shearing walls are stationary.

FIGURE 8a is a perspective view of another form of the invention in which the stationary shearing walls are at an angle to the vertical.

Broadly stated, the process of this invention comprises imposing a shear stress on sewage sludge and other slowly settling suspensions to induce steady state velocity gradients in a controlled manner thereon thereby causing agglomeration of the solids contained therein. By agglomerating sludge particles into larger particles, settling takes place more rapidly. The direction of the settling effected by the process of the invention may be parallel to, perpendicular to, or in any direction relative to the orientation of the plane of the velocity gradient. This settling may take place while the suspension is in a channel or annulus under the action of gravity, under the action of an external force or any combination thereof, said settling taking place in the direction of the net force. The net force itself may be at any angle with respect to the plane of the velocity gradient. As shown hereinafter the shear stress which induces the velocity gradients may be produced by various suitable means and apparatus.

This process also involves removing concentrated slurry containing the solids initially present in the suspension from the zone where the velocity gradient is imposed on the suspension and causing the supernatant clear liquid to overflow therefrom.

Figure 1:
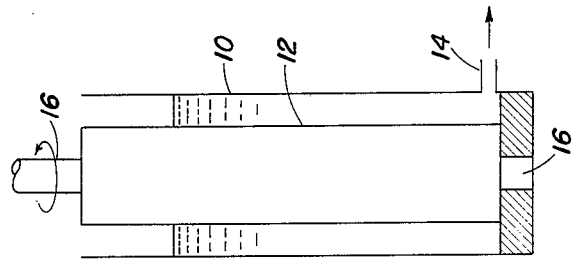
FIGURE 1 is a cross-sectional front elevation view of one embodiment of the invention.

Referring now to the drawings, FIGURE 1 shows an embodiment of the invention which comprises a cylindrical vessel 10 having an inner cylinder 12 and a discharge port 14. Cylinder 12 is mounted on axle 16 which is connected to a suitable source of motive power capable of rotating the cylinder at a speed which depends upon the diameter of the vessel and the cylinder. If desired, more than one cylinder of different diameters may be mounted in vessel 10 and arranged so as to rotate in the same or in the opposite direction or at different speeds. The cylinder or cylinders may have the same diameter along their entire length or the diameter of the cylinders may be varied along the length thereof.

With the embodiment shown on FIGURE 1, it is possible to either rotate inner cylinder 12, vessel 10 or both simultaneously in the same or in different directions. In operation, a volume of sludge is poured into the space between cylinder 12 and vessel 10 and either or both is rotated. The sludge solids agglomerate and settle and the concentrated slurry containing them is removed through discharge port 14. The clear liquid is siphoned off or otherwise removed from the top of the vessel.

Figure 9:
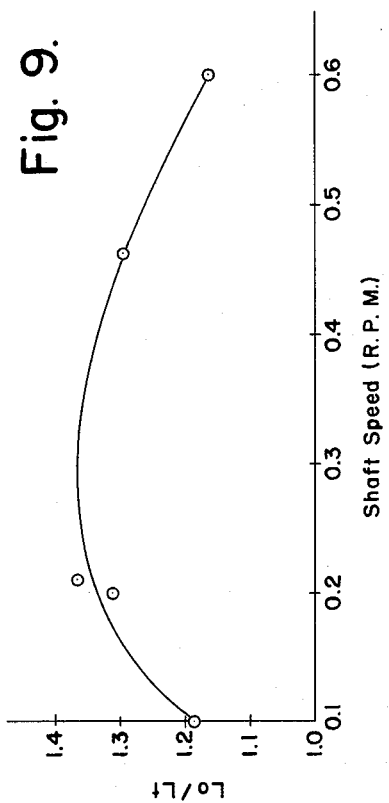
FIGURE 9 is a graph showing the relationship, for a given vessel configuration, between the settling rate and the rotation rate of the cylinder therein.
Figure 10:
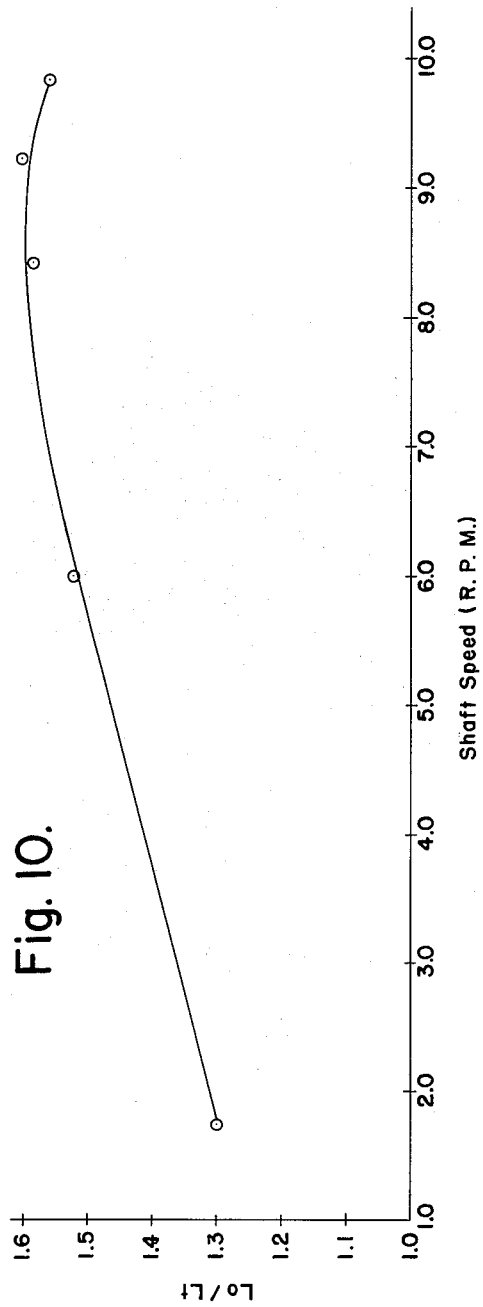
FIGURE 10 is another graph showing the same relationship shown in FIGURE 9 but for another vessel configuration.

With the embodiment of FIGURE 1, it has been found that the rate of settling depends on the difference in the speeds of rotation between the cylinder 12 and vessel 10 of the system. The results of a number of runs with the same slurry are represented by the graphs of FIGURES 9 and 10. These show the effect, for two geometries, of the number of rotations per minute on the height of settled sludge after a period of 22 minutes. In these figures, $Lo$ is the original height of liquor in the annulus between the cylinder and the vessel walls, $Lt$ is the height of settled sludge after 22 minutes. $Lo/Lt$ is approximately equal to $Ct/Co$, the ratio of the concentration of solids in the settled sludge to that in the original suspension. In the graph shown in FIGURE 10, the ratio of the diameter of the inner cylinder 12 to the diameter of vessel 10 was 0.875. The device in which the data shown in FIGURE 10 was obtained had a diameter ratio of 0.5. As indicated in the two graphs, for these geometries, the ratio $Lo/Lt$ or the increase in sludge concentration after a definite period of time increases with an increase in the number of rotations per minute of the inner cylinder to some maximum value and then decreases with further increase in the speed of rotation. This optimum speed of rotation at which the settling occurs depends on both the ratio of the inner and outer cylinder diameters as well as the absolute values of the diameter.

While the device of FIGURE 1, as shown is not designed to operate continuously, it may be modified to so operate, if desired, by, for example, connecting one end of a conduit to a source of sludge and having the other end in the space between the inner cylinder and the vessel walls and immersing a siphon in the vessel to draw off clear liquid and another siphon to draw off the concentrated sludge.

The remaining figures of the drawings show devices in which the process of the invention can be carried out continuously. That is to say, the sludge or other suspension is continuously fed to the apparatus and clear liquor and concentrated sludge are continuously obtained therefrom.

Figure 2:
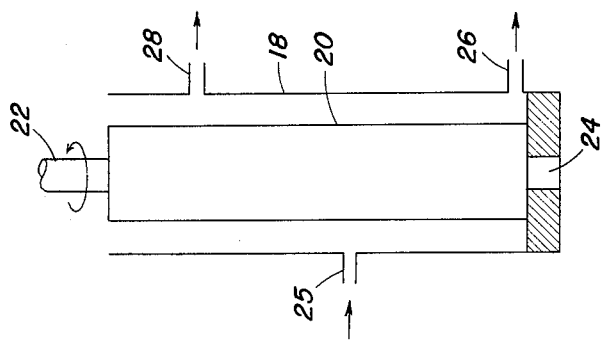
FIGURE 2 is a cross-sectional front elevational view of another embodiment of the invention in which provision is made for the continuous flow of sludge.

Thus, FIGURE 2, shows the modifications made in the device of FIGURE 1 in order to enable it to operate continuously. The device of FIGURE 2 comprises an outer cylindrical vessel 18. A cylinder 20, keyed on shaft 22 is rotatably mounted in vessel 18 on bearing 24, with shaft 22 being connected to a suitable source of motive power. A feed inlet 25 is provided on the side of the vessel. An outlet port 26 for solids is provided at the bottom of the vessel. An outlet 28 for clear liquid is provided in the upper part of vessel 18. Outlets 26 and 28 are preferably located on the side of vessel 18 opposite that on which inlet 25 is mounted.

In operating the above-described embodiment of the invention, the slurry to be treated is fed in through inlet 25 while the cylinder 20 is rotated at a preselected speed. Settled sludge is continuously drawn by gravity or other means through outlet 26 while clear liquid passes out through outlet 28.

Obviously, vessels 10 and 20 as well as the cylinders may be of any desired size. While they have been shown in the drawings as being cylindrical in shape, they likewise may assume other effective shapes. Similarly, the cylinder and the vessel need not be concentric but may also be disposed eccentrically with respect to one another.

Figure 3:
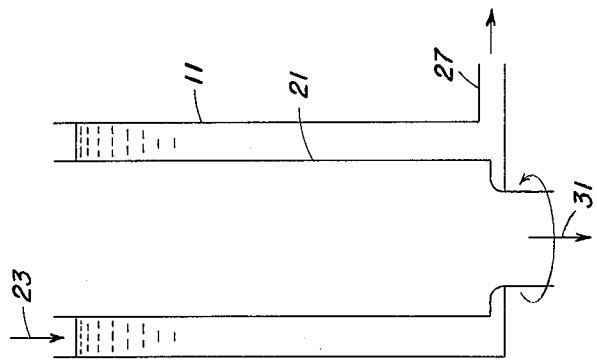
FIGURE 3 is a perspective view of the invention having a series of concentric rotating assemblies.
Figure 3:
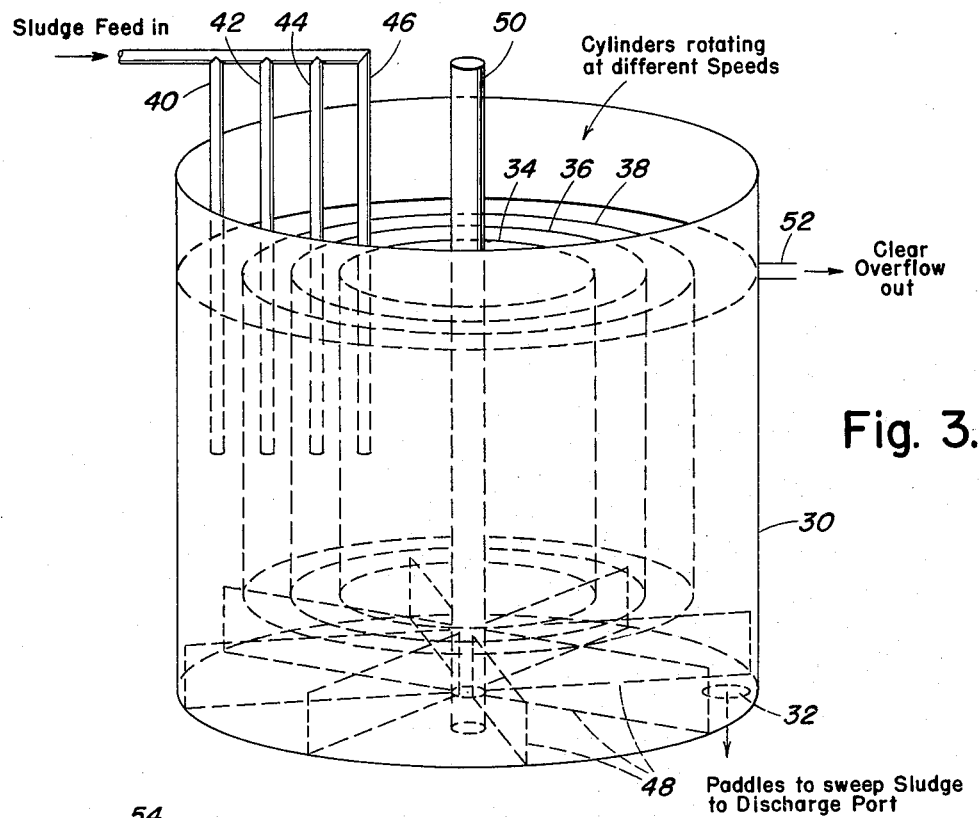

The present invention also includes the provision of a plurality of slowly moving surfaces to produce the velocity gradient necessary to cause the agglomeration and settling of solid particles. One such arrangement is shown in FIGURE 3, and comprises a circular vessel 30 having a discharge port 32 for removing settled concentrated sludge. Mounted inside vessel 30 are cylinders 34, 36 and 38 extending in the lower part of vessel 30, which are actuated by means (not shown) operative to rotate each at the same or different speeds. Sludge inlets 40, 42, 44 and 46 feed the liquid to be treated in the annular space between the internal surfaces. Paddles 48, keyed on rotating shaft 50 and mounted below the rotating cylinders just above the bottom of vessel aid in sweeping concentrated sludge to the discharge port 32.

In operating the embodiment of the invention shown on FIGURE 3, sludge is continuously introduced through the inlets while the cylinders are rotated at different speeds. Concentrated sludge agglomerated by the velocity gradients settles and drains out continuously from outlet 32 while clear overflow passes out through outlet 52 at the top of vessel 30 above the upper end of the rotating cylinders.

Figure 4:
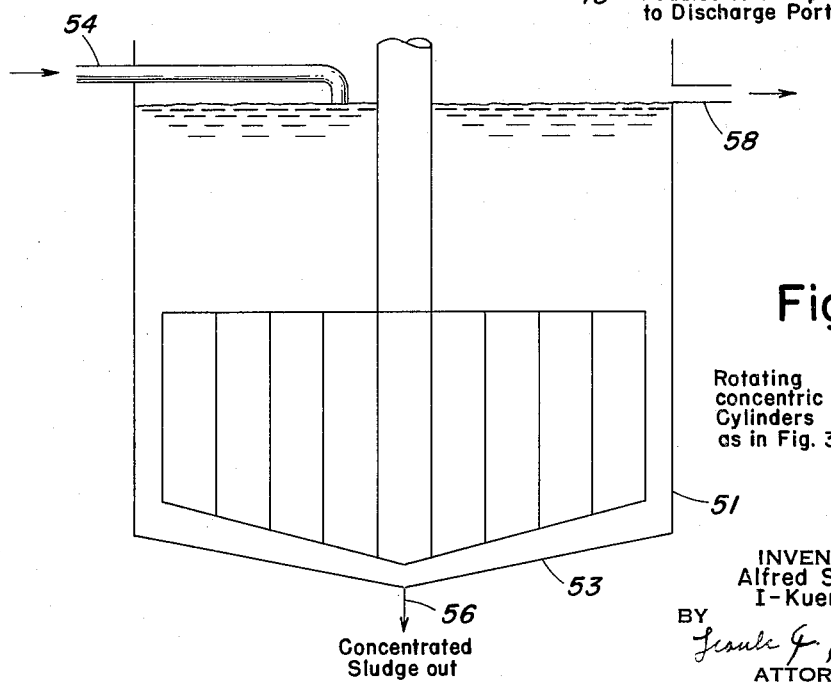
FIGURE 4 is a cross-sectional view of another version of the invention having a free settling zone above the multiple rotating cylinders.

FIGURE 4 shows the adaptation of the present invention concept to a sedimentation tank to which is fed raw sewage or sludge. As shown, a plurality of concentric rotating cylinders of the type used in the embodiment of FIGURE 3 are mounted in the lower part of a sedimentation tank 51 and spaced from the walls and tapered bottom 53 thereof to permit their rotation at the same or different speeds by means not shown. The lower part of the tank in which the rotating cylinders are mounted defines a shear settling zone from which sewage or dilute sludge introduced at inlet 54 passes out through outlet 56 at the bottom of tank 51. The top of these rotating cylinders defines a free settling zone from which clear liquid overflows through outlet 58 at the top of the tank.

FIGURE 5 shows another embodiment of the invention employing a centrally located porous rotating inner cylinder 21 suitably composed of a screen, perforated metal or other highly porous media, mounted in outer vessel 11. A slurry to be treated is introduced in the space between the cylinder and the vessel, at 23. Water passes through the pores of the cylinder and out through central aperture 31. Solids, unable to pass through the pores of the cylinder agglomerate and leave through outlet 27 at the bottom of vessel 11.

Figure 6:
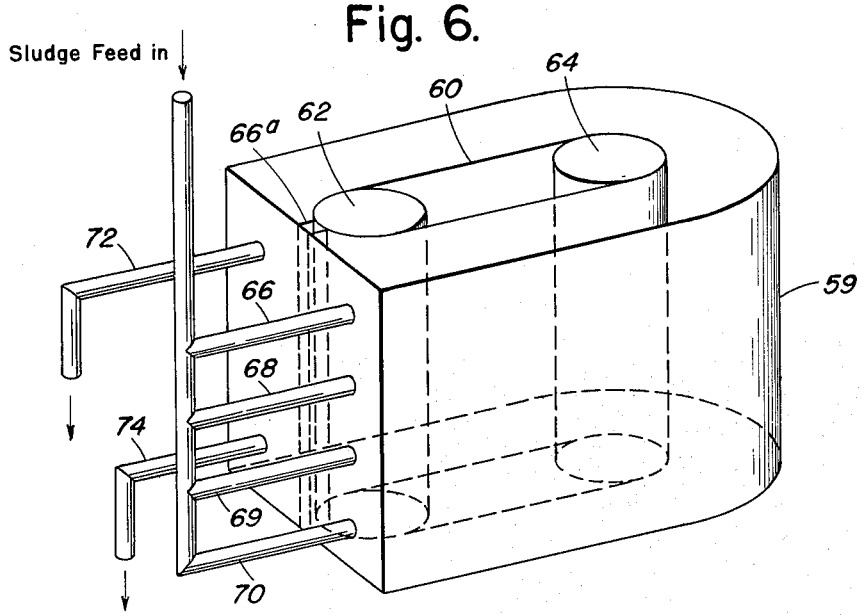
FIGURE 6 is a perspective view of another form of the invention using a linear belt shearing system with settling taking place in a direction normal to the plane of the velocity gradient.
Figure 7:
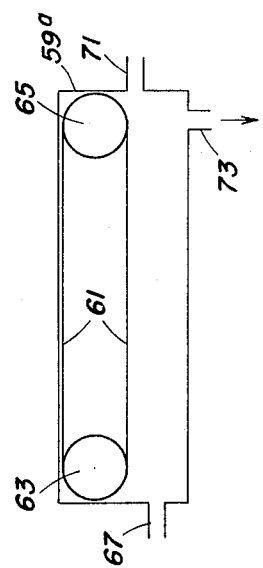
FIGURE 7 is a cross-sectional view of another form of the invention in which the linear shearing belt of FIGURE 6 is arranged so that settling will take place in the same direction as the plane of the velocity gradient.

In the embodiment of the invention shown on FIGURES 6 and 7, the liquid to be treated is pumped into the space between a moving belt and a stationary wall. The device of FIGURE 6 comprises a vessel 59 having therein a belt 60 trained around power pulley 62 and idler 64. Sludge is fed in vessel 59 through inlets 66, 68, 69 and 70. A controlled steady-state velocity gradient is induced by the moving belt and the stationary walls. Clear liquid flows out of outlet 72 and concentrated sludge comes out of outlet 74. A baffle 66a may be provided between the sides of the vessel 59 and the belt 60 to insure that the liquid will pass around the vessel from inlet to outlet without short circuiting.

FIGURE 7 shows another embodiment of the invention comprising vessel 59a in which is mounted moving belt 61 actuated by pulley 63 and trained around idler 65. Here the belt is mounted so close to one side of the vessel and the slurry filled to a point touching the lower side of the belt so that only the bottom side thereof exerts stress on the fluid introduced through inlet 67. Clear liquid overflows through outlet 71, at the top; and solids leave through outlet 73 at the bottom. The belt arrangement can be either horizontally or vertically disposed in vessel 59a.

Figure 6A:
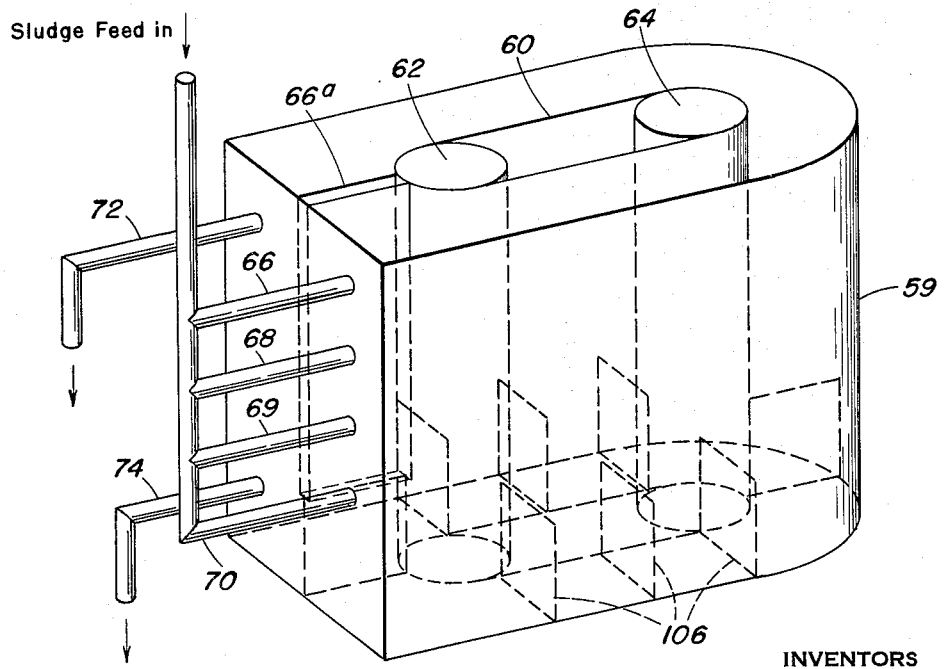
FIGURE 6a is a perspective view of a form of the invention shown in FIGURE 6 in which paddles are provided to aid in discharging the concentrated slurry.

FIGURE 6a shows another embodiment of the invention similar to that shown in FIGURE 6 in every respect but having paddles 106 all along the bottom portion of the belt to aid the outflow of solids through outlet 74. In this embodiment the belt is separated from the walls of the vessel 59 by a distance greater than the extension of the paddles so as to permit unhampered rotation of the belt which is rotated slowly enough so that its paddles do not stir up any solids. The number of paddles used may be varied as required.

FIGURE 8 shows a rectangular vessel 96 open at its top 98. Slurry is introduced therein through inlets 100 at such a rate as to induce the flocculation of the solid particles as a result of the shear stress exerted on the slurry by the stationary walls of the vessel.

The device shown in FIGURE 8 is shown in modified form in FIGURE 8a where the shape of the vessel has been changed to aid the flow of concentrated solids by widening the lower part of vessel 99.

The present invention provides in a simple manner for the more complete separation of liquids from solids in slurries which settle with difficulty. Simple and reliable separation apparatus are also provided by the invention, which apparatus affords uniform clarification with great efficiency and low cost. While sludge separation is mentioned herein as an example of a particularly advantageous employment of the invention, the same has general utility in the separation of solids from liquids.

By increasing the concentration of the sludge, marked savings can be effected in many of the processes used for sludge disposal. Less land will be required for lagooning, sludge digesters can have greater capacity, wet combustion can be made either self sustaining or more economical and barge capacity can be increased.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. Apparatus for separating the components of a mixture consisting of liquids and slowly settling solids, comprising a vessel, a belt positioned horizontally substantially in the center of said vessel and spaced from the side walls thereof, means for rotating said belt, inlet means on one side of said vessel for introducing said mixture in the space between said belt and the walls of said vessel such that said mixture is subjected to a controlled shear stress which is induced by the moving belt and the side walls of the vessel, outlet means in the lower part of said vessel on the opposite side from said inlet means, and liquid outlet means in the upper part of said vessel above said outlet means for the concentrated solids.

2. Apparatus for separating the components of a mixture consisting of liquid and slowly settling solids, comprising a vessel, a belt in said vessel spaced from the side walls thereof, means for rotating said belt, said vessel having inlet means leading to the space between the belt and the side walls of the vessel such that said mixture entering the vessel through said inlet means is subjected to a controlled shear stress which is induced by the moving belt and the stationary walls of the vessel and producing a steady state velocity gradient, concentrated sludge outlet means in said vessel, and liquid outlet means above the concentrated sludge outlet means.

3. Apparatus as set forth in claim 2 wherein said inlet means comprises a plurality of conduits arranged one above the other and each leading into the space between the moving belt and the side walls of the vessel.

4. Apparatus as set forth in claim 2 wherein said belt is formed as a closed loop having straight runs between said means for rotating said belt, said inlet means being arranged to direct the mixture into the space adjacent one straight run of the loop, and said concentrated sludge and liquid outlet means being arranged to receive clear liquid and concentrated sludge from the space adjacent another straight run of the loop.

5. Apparatus as set forth in claim 2 further comprising paddles carried by the belt and extending into the space between the belt and the walls of the vessel.

References Cited by the Examiner
UNITED STATES PATENTS

| | | | |
|---|---|---|---|
| 2,413,375 | 12/1946 | Pomeroy | 210—49 X |
| 2,922,761 | 1/1960 | Davenport | 210—49 |
| 2,988,782 | 6/1961 | Parrish et al. | 210—49 X |
| 3,067,878 | 12/1962 | Genter et al. | 210—83 |
| 3,099,622 | 7/1963 | Woerther | 210—49 |

MORRIS O. WOLK, *Primary Examiner.*